(12) United States Patent
Fritz

(10) Patent No.: US 9,355,576 B2
(45) Date of Patent: May 31, 2016

(54) DUMMY OBJECT, IN PARTICULAR FOR FUNCTIONALLY TESTING DRIVER ASSISTANCE SYSTEMS IN MOTOR VEHICLES

(75) Inventor: Martin Fritz, Kobenz (AT)

(73) Assignee: 4activeSystems GmbH, Traboch (AT)

( * ) Notice: Subject to any disclaimer, the term of this patent is extended or adjusted under 35 U.S.C. 154(b) by 252 days.

(21) Appl. No.: 14/118,321

(22) PCT Filed: May 16, 2012

(86) PCT No.: PCT/EP2012/059203
§ 371 (c)(1),
(2), (4) Date: Nov. 18, 2013

(87) PCT Pub. No.: WO2012/156484
PCT Pub. Date: Nov. 22, 2012

(65) Prior Publication Data
US 2014/0102224 A1    Apr. 17, 2014

(30) Foreign Application Priority Data

May 18, 2011    (AT) .................................. A 705/2011

(51) Int. Cl.
*G09B 23/32*    (2006.01)
*G09B 23/30*    (2006.01)
*G09B 23/28*    (2006.01)

(52) U.S. Cl.
CPC ................ *G09B 23/32* (2013.01); *G09B 23/28* (2013.01); *G09B 23/30* (2013.01)

(58) Field of Classification Search
USPC ....................................................... 73/866.4
See application file for complete search history.

(56) References Cited

U.S. PATENT DOCUMENTS

| 3,098,319 | A |   | 7/1963 | Ellis |   |
|---|---|---|---|---|---|
| 3,583,098 | A |   | 6/1971 | Bear |   |
| 5,224,896 | A | * | 7/1993 | Terzian | A63H 11/18 446/268 |
| 2005/0066705 | A1 | * | 3/2005 | Choi | G09B 23/32 73/12.09 |
| 2005/0155441 | A1 | * | 7/2005 | Nagata | G01M 17/0078 73/865.3 |
| 2006/0075826 | A1 | * | 4/2006 | Roberts | G01N 3/48 73/788 |

FOREIGN PATENT DOCUMENTS

| DE | 102007035474 | 6/2009 |
|---|---|---|
| DE | 102008025539 | 12/2009 |
| EP | 1734352 | 12/2006 |
| FR | 2680902 | 5/1993 |
| WO | WO0160474 | 8/2001 |

OTHER PUBLICATIONS

References cited in the ISR (2 pages), Oct. 9, 2012.

* cited by examiner

*Primary Examiner* — Hezron E Williams
*Assistant Examiner* — Mark A Shabman
(74) *Attorney, Agent, or Firm* — Indiano & McConnell, LLC; E. Victor Indiano

(57) ABSTRACT

Embodiments of the invention relate to a three-dimensional dummy object, in particular for functionally testing driver assistance systems in motor vehicles, comprising a head, a skeleton, a trunk, movable pelvis and movable legs. The skeleton comprises a trunk skeleton having cavities, to which the arms and legs are articulated, wherein the legs each have a thigh and a lower leg articulated to the thigh, wherein a drive unit and a receiver/control unit are installed in the trunk skeleton, which receiver/control unit receives signals correlating to the relative velocity of the moving dummy object as an input quantity, such that the movement pattern of the thighs and lower legs can be varied according to the relative velocity of the dummy object by means of an installed movement mechanism.

23 Claims, 12 Drawing Sheets

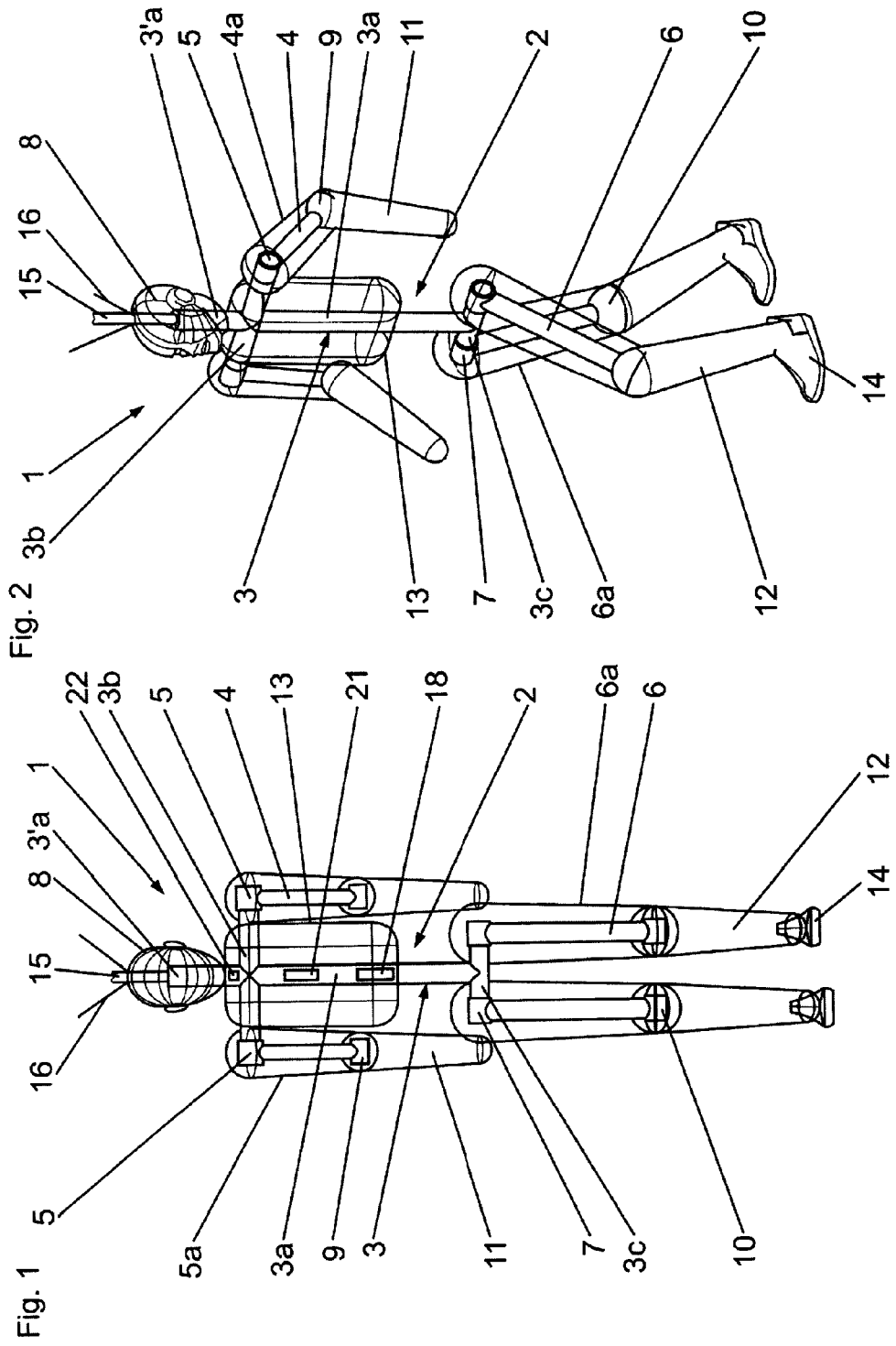

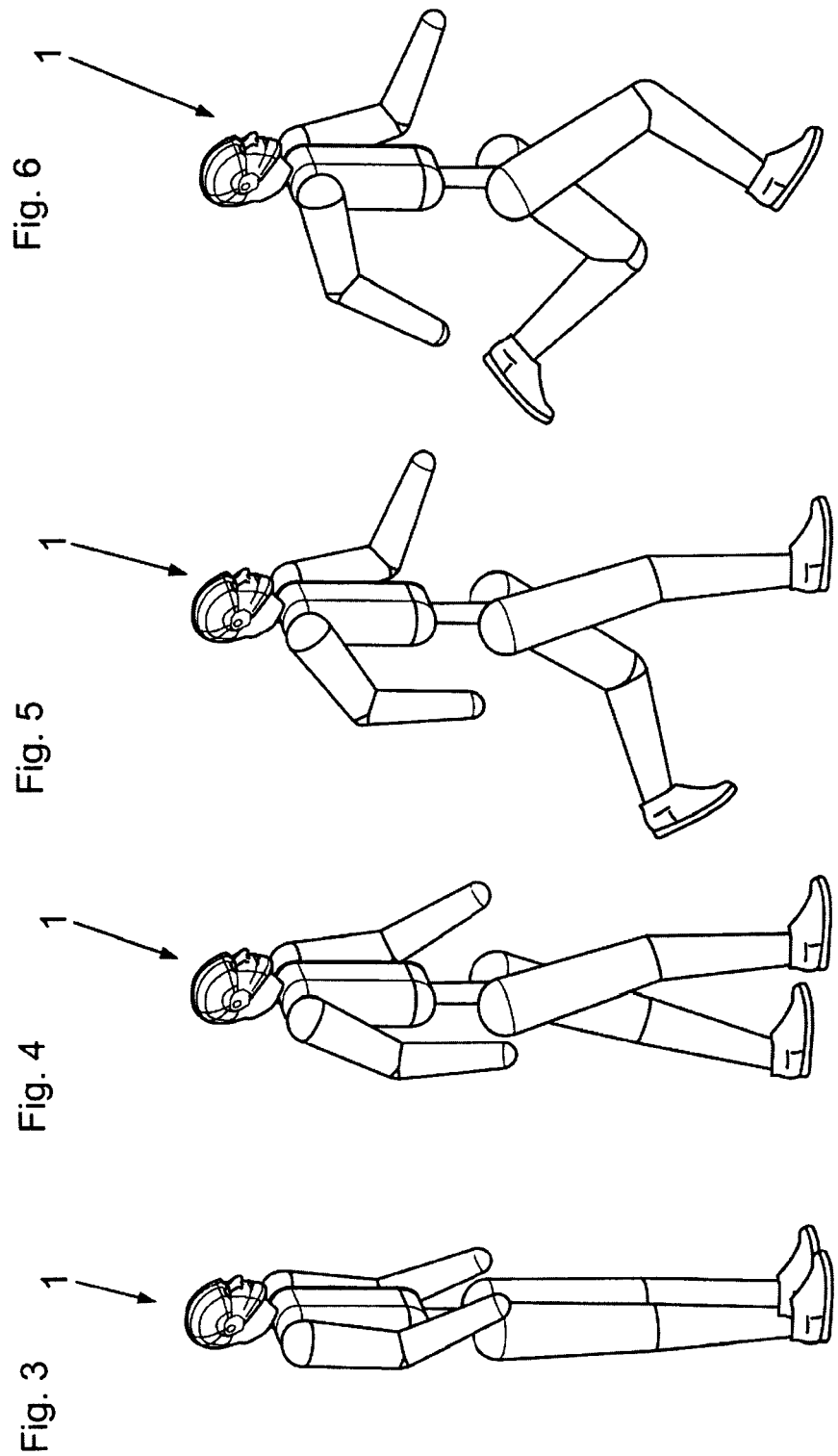

DUMMY OBJECT, IN PARTICULAR FOR FUNCTIONALLY TESTING DRIVER ASSISTANCE SYSTEMS IN MOTOR VEHICLES

This application claims the benefit of the filing date of the Austrian Patent Application No. A 705/2011 filed 18 May 2011, the disclosure of which is hereby incorporated herein by reference.

FIELD OF THE INVENTION

Embodiments of the invention relate to a three-dimensional dummy object, in particular for functionally testing of driver assistance systems in motor vehicles, comprising a head, a skeleton, a trunk, movable arms and movable legs. It is known to install driver assistance systems, which comprise a sensor system, which is provided for detecting the surroundings of the vehicle, in motor vehicles. Such driver assistance systems are to identify critical traffic situations and to warn the vehicle driver, so that accidents can be avoided. Driver assistance systems can furthermore avoid or lessen the consequences of accidents in that certain components of the vehicle, such as the brake, the steering mechanism or the airbags, for example, are activated based on the particular situation.

TECHNOLOGICAL BACKGROUND

A system for functionally testing a driver assistance system is known from DE 10 2007 035 474 B4, for example. The vehicle, to which the driver assistance system to be tested is assigned, can be moved on a test track and receives and processes information relating to the surroundings of the vehicle. The system further comprises at least one rigid dummy object, which, in order to simulate a real traffic situation, can be displaced on the test track such that it is at least temporarily located in the surrounding area which can be detected by the driver assistance system. The dummy object, which can be moved separately from the vehicle and independent of the movement of the vehicle, is arranged on a rail device, so that a mechanically stable attachment of the dummy object is ensured and a guided displacement of the dummy object is possible in a reversible and reproducible manner.

A system for simulating collisions of a dummy object with a motor vehicle is known from US 2005/0155441 A1. The dummy object, which is suspended by ropes on a rail system and which can be displaced in a movement transversely to the driving direction of the approaching motor vehicle, imitates a human body and comprises a head, a neck, a trunk as well as arms and legs. A skeleton made of wood is located on the interior thereof.

DE 10 2008 025 539 A1 discloses a testing device for a pedestrian protection system in a motor vehicle, which moves along a route. Provision is made for a dummy object, which simulates a pedestrian and which can be displaced transversely to the route of the motor vehicle. The dummy object is substantially embodied so as to be two-dimensional and comprises a trunk, two legs and at least one arm. At least one of the two legs and/or at least one of the arms can be moved relative to the trunk by means of an actuating element via ropes and/or via connecting rods. The legs and at least the one provided arm are thereby movably supported on the trunk in the form of a string puppet, so that the arms as well as the legs can be displaced forwards and backwards into a pivot motion. The trunk, the arms and the legs are made of plastic plates, which comprises a thickness of approximately 3 mm, and are coated with foam on the side, which faces the vehicle.

The movement behaviour of pedestrians in traffic, however, is much more complex. In principle, three types of basic movements can be observed, namely walking, running and racing. Walking is that type of movement, which can be found most frequently in traffic. Thereby, one foot always touches the ground, the other foot touches down before the body does, the limbs are approximately stretched and the upper part of the body remains substantially straight. When running, both feet are without contact to the ground for a short period of time and the step size is larger than when walking. For the most part, the one foot touches down directly below the body, the upper part of the body remains straight for the most part or leans slightly forward. The velocity can be constant for a longer period of time. Running children, who are initially covered by an object, for example a parked vehicle, can very frequently be found in traffic. In the case of the third type of movement, the racing, the velocity can only be maintained for a relatively short period of time. The feet lose contact with the ground and touch down with the ball of the foot below the body, the step size is very large, the upper part of the body clearly displaces forward considerably.

In the case of active driver assistance systems, which either warn the passengers of dangerous situations or which intervene in the driving process independently, it is necessary to test the functional reliability thereof by means of suitable methods using dummy objects. Testing methods and dummy objects are required, which reflect the corresponding traffic situations, which can occur, as realistically as possible. In the case of recognizing pedestrians, the detection process is typically carried out in two steps. In the case of the initial detection, it is important that all pedestrians in the relevant surrounding area are detected, if possible. It is accepted thereby that objects are also detected incorrectly as possible pedestrians. In the case of the second step, the classification, the detected objects are classified as pedestrians or as nonpedestrians. For classification purposes, time-dependent features of the detected objects, such as leg movements, for example, are used for the allocation. When re-creating a simple pedestrian crossing, the viewing angle thereof can change by up to 60° due to the approach of the vehicle in the event that two-dimensional test objects, as are known from DE 10 2008 025 539 A1, for example, are now used as dummy objects. A two-dimensional object would thereby merge from a contour, which only describes the silhouette, into a line contour. This would lead to incorrect data in response to the development and testing of driver assistance systems.

SUMMARY OF THE INVENTION

It is thus important to embody dummy objects so as to be three-dimensional and as human-like as possible and to move them as realistically as possible. This is where embodiments of the invention comes into play, the task of which is to provide a dummy object, which can be used in particular as pedestrian or bicycler for functionally testing driver assistance systems in motor vehicles, by means of which a movement characteristic, which is as realistic as possible, can be re-created mainly in the movement types walking, running and racing, which, as a three-dimensional object, provides for an optical illustration and radar reflectivity, which is as realistic as possible, from all viewing angles, and which can reflect the external movement behaviour as well as the internal movement characteristic of at least the leg movements.

According to an embodiment of the invention the skeleton comprises a trunk skeleton having cavities, to which the arms and legs are articulated, wherein the legs each have a thigh and a lower leg articulated to the thigh, wherein a drive unit and a receiver/control unit are installed in the trunk skeleton, which receiver/control unit receives signals correlating to the relative velocity of the moving dummy object as input quantity, such that the movement pattern of the thighs and lower legs can be varied according to the relative velocity of the dummy object by means of an installed movement mechanism.

The dummy object according to an embodiment of the invention is thus embodied such that a highly realistic internal movement characteristic of at least the leg movements, matching certain movement patters, for example those of walking, running and racing, is possible. The skeletal structure of the dummy object comprising a trunk skeleton provides for an embodiment, which is high-strength, insusceptible to shock and very light and which provides for the installation of the drive unit and of the control unit and, if necessary, of the receiver.

In the case of a preferred embodiment of the invention, the trunk skeleton comprises a central column, which supports the head, two shoulder parts and two pelvis parts and is embodied in one piece. This provides for an execution of the trunk skeleton, which is both stable and light.

For a re-creation of the movement pattern, which is as realistic as possible, which is different depending on the type of movement—walking, running and racing—, provision is made for the movement patterns of the legs to comprise variations of the leg limiting angles between the thigh and the central column of the trunk skeleton and the knee limiting angles between the thigh and the lower leg.

In the case of a preferred embodiment of the dummy object according to an embodiment of the invention, the arms each have an upper arm and a forearm, which is articulated thereto, wherein upper arm and forearm can be moved according to movement patterns, which can be varied according to the relative velocity of the dummy object by means of an installed movement mechanism. In the case of a dummy object, which is embodied in this manner, the arm movements can thus also be re-created in a largely realistic manner, in particular when the movement patterns of the arms comprise variations of the arm angles between the upper arm and the central column of the trunk skeleton and the elbow angles between the upper arm and the forearm.

For an optimal re-creation of the arm and of the leg movements, it is advantageous, when the dummy object comprises further skeleton parts, in particular one upper arm join in each upper arm and one thigh element in each thigh.

In addition to the drive unit and the control unit or the receiver unit, respectively, a battery pack with rechargeable batteries can also be positioned or installed, respectively, in the components of the trunk skeleton, which are embodied so as to be hollow.

The body parts of the dummy object, which are visible from outside, are to represent re-creations of the corresponding human body parts, which are as realistic as possible. This is possible, in particular, when, according to a preferred embodiment of the dummy object, the head, the arms and/or the legs and/or at least a part of the trunk are moulded parts of EPP or EPE. The arms and/or the legs and/or at least a part of the trunk can thereby also be embodied as inflatable hollow plastic bodies. The skeleton parts are to consist of a radar-visible, stable and yet light material. It is thus particularly advantageous, when the skeleton parts are made of CFPK.

Dummy objects, which are embodied according to embodiments of the invention, can be coupled to different movement systems. The movement system is a part of the total system and provides for a controlled and reproducible movement of the dummy object.

In particular movement systems are known, with which the dummy object is moved across a rail system or the like from the top. It is advantageous, when corresponding connecting or coupling elements are already provided on the dummy object itself. The central column, for example, can thus be fixedly connected to a rod, which projects above the head and which forms a connecting element to a movement system, in particular such a movement system, which comprises a rail system. The dummy object can be pulled out of the collision area quickly by means of this connection.

Provision can furthermore be made for ropes, in particular made of aramid fibres, PP fibres or PE fibres, which are connected to the central column of the skeleton or the rod and which form further connecting elements to the movement system.

The movement mechanism in the dummy object consists of a plurality of individual components, which are moved or controlled, respectively, in accordance with the desired motion sequences. A movement mechanism, the individual components of which, which move the body parts, are servo drives, which are arranged in the joints, is particularly variable.

Embodiment variants are also possible, with which a coupling of the movement of the forearms to the upper arms or of the lower legs to the thighs takes place via mechanically operating operative connections or mechanisms, respectively.

In the case of a preferred embodiment alternative of such a coupling mechanism for a positive coupling for moving the lower legs or the forearm, provision is in each case made for a link part, which is fixedly connected to the trunk skeleton and which comprises an articulated arm, which is fixedly connected to the elbow joint or the knee joint, respectively, a rigid connecting element between articulated arm and link part, and an elastic connecting element between the articulated arm and the trunk skeleton or a skeleton part, which is fixedly connected thereto, respectively.

The rigid connecting element comprises a sliding element, which is connected to the link part and which can run on two link tracks of the link part, which are formed differently. By designing the course of the link track accordingly, the corresponding movement of the lower legs or of the forearms, respectively, can also be made or adapted accordingly, respectively, in such a manner in response to a movement of the thighs or of the upper arms, respectively.

In the case of a further embodiment of the invention, the movement mechanism, which is installed in the dummy object, comprises a drive unit having a motor with an asynchronous drive, which drives two shafts, which set the shoulder joints and the hip joints in rotary motion via angular gears.

The dummy object according to embodiments of the invention can also be displaced or moved, respectively, by means of other movement systems. In the case of a movement system, which uses a support rope and a hauling rope, substantially analogously to a cableway, the trunk of the dummy object can be embodied such that it can be suspended so as to slide or roll, respectively, in one of the ropes, in particular in the support rope of the movement system.

Further features, advantages and details of embodiments of the invention will now be described in more detail by means of the schematic drawing, which illustrates exemplary embodiments.

DESCRIPTION OF THE DRAWINGS

FIG. 1 shows a front view of a dummy object, which is embodied according to an embodiment of the invention, FIG. 2 shows the dummy object in an angular view in a movement phase, FIG. 3 to FIG. 6 show the dummy object in response to standing, walking, running and racing.

DETAILED DESCRIPTION OF EXEMPLARY EMBODIMENTS

Figure 7:
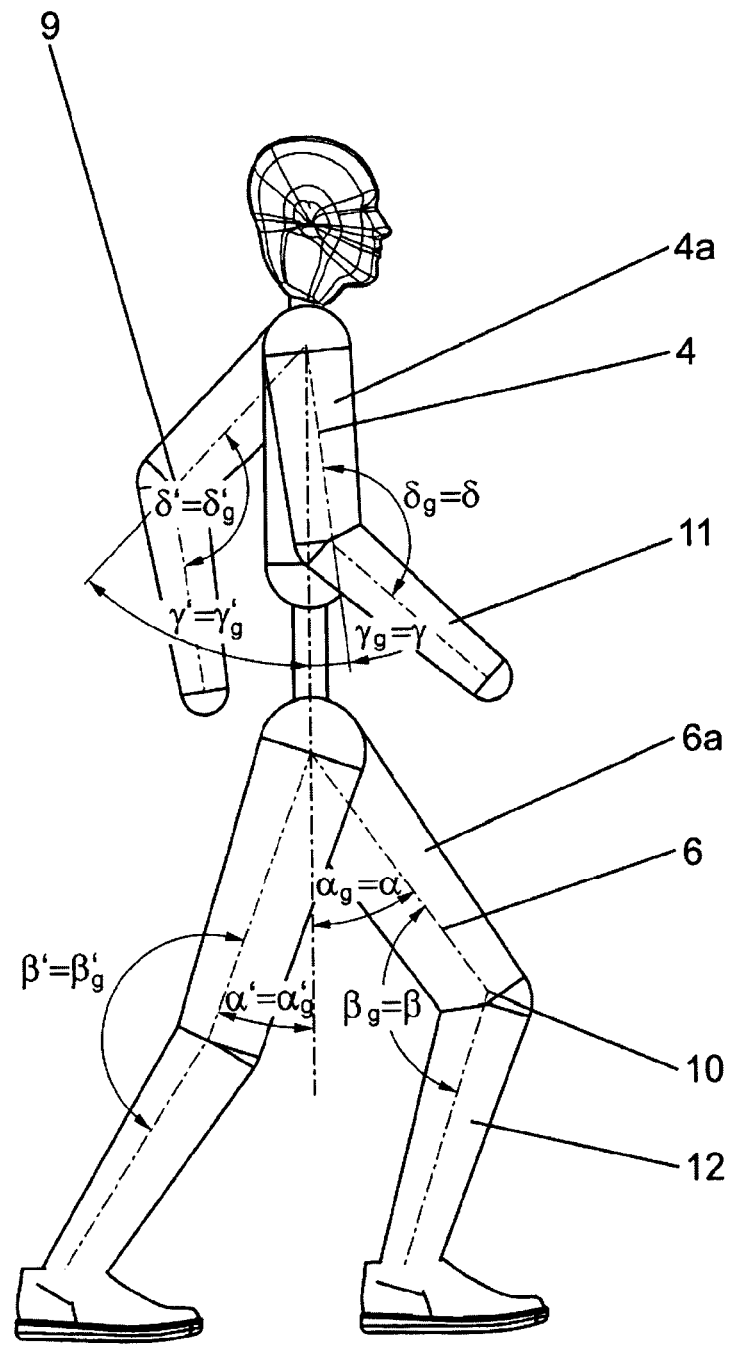
FIG. 7 shows the dummy object in side view in a movement phase.

The figures show a dummy object 1, which simulates a pedestrian, in an exemplary manner. The dummy object 1 comprises a three-dimensional body and simulates a grownup of average body size in the illustrated embodiment. Dummy objects 1, which are embodied according to embodiments of the invention, are produced in different sizes or dummy classes, respectively, so as to represent children between the ages of 3 and 6, grownups and seniors, for example. The dummy object 1 comprises a skeleton 2 consisting of a trunk skeleton 3, two upper arm elements 4 and two thigh elements 6. The trunk skeleton 3 is preferably embodied in one piece and is comprised of a vertical central column 3a, which corresponds substantially to the human spine, two shoulder parts 3b, which project away therefrom in particular at a right angle, and two pelvis parts 3c, which also project away therefrom in particular at a right angle, and which are embodied so as to be shorter than the shoulder parts 3b. The central column 3a comprises a short neck section 3'a, which projects beyond the shoulder parts 3b and which supports a head 8. The components of the trunk skeleton 3, the upper arm elements 4 and the thigh elements 6 are made in particular as tubes of a material, which is radar-visible, water-tight, high-strength and which is insusceptible to shock, preferably of CFRP (carbon fibre reinforced plastic). As is shown in FIG. 1, a drive unit 18 comprising at least one motor, a receiver/control unit 22 and a power supply, in particular a battery back 21 with rechargeable batteries, are accommodated in the cavities of the trunk skeleton 3, in particular in the interior of the central column 3a. Openings in the trunk skeleton 3, which can be accessed from outside and which can be closed, allow for the installation, the replacement and the maintenance of these components.

The upper arm elements 4 and the thigh elements 6 are each connected to a shoulder joint 5 or to a hip joint 7, respectively, in each case to a shoulder part 3b or a pelvis part 3c of the trunk skeleton 3.

The head 8 is a part, which is milled or a foam-moulded part from EPP (expanded polypropylene) or from EPE (expanded polyethylene), which simulates the human body and which is fixedly connected to the trunk skeleton 3. Electrically heatable mats (resistance heating mats) can be attached to the head surface, so as to be able to depict the head 8 via infrared camera systems. The outside of the head is coated or sealed, respectively, for example by means of skin-coloured natural rubber or silicon. Forearms 11 are attached to the upper arm elements 4 via elbow joints 9, lower legs 12 are attached to the thigh elements 6 via knee joints 10, wherein the forearms 11 and the lower legs 12 do not include any skeleton parts. A trunk 13, which largely covers the shoulder parts 3b and the central column 3a, is a part, which simulates the human chest, which is a moulded part, which is either made of EPP, EPE or PU (polyurethane) foam in ribbed design, which is milled or cut, or which is an inflatable component consisting of PVC or which is a foam-moulded part. The trunk 13 protects the trunk skeleton 3 from being damaged in response to a possible unintentional collision of the dummy object 1 with a vehicle. The upper arm elements 4 are encased by upper arms 4a, the thigh elements 6 are encased by thighs 6a. The upper arms 4a, the forearms 11, the thighs 6a and the lower legs 12 are components, which replicate the corresponding human body parts and which are slightly conical and are parts, which are either inflatable hollow bodies, which consist in particular of PVC, or parts, which are made of EPP or EPE and which are brought into the corresponding form by means of milling or cutting. Electrically heatable mats (resistance heating mats) can be attached to the free end sections of the forearms 11, so as to allow for an illustration of the "hand sections" by means of infrared camera systems. The lower legs 12 are rigidly connected to foot parts 14, which are in particular components of the lower legs 12. The joints 5, 7, 9 and 10 are in particular sliding radial bearings, which are low-maintenance, insusceptible to shock, made of plastic, for example of polyamide (PA) or of polyoxymethylene (POM).

The head 8 can be permeated by a rod 15, which consists of laminated fiberglass or aramid-reinforced plastic, for example, which is fixedly connected to the trunk skeleton 3. Ropes 16, in particular made of aramid fibres, PP fibres or PE fibres, are connected to the rod 15, said ropes 16, together with the rod 15, forming the connecting elements of the dummy object 1 to a movement system, as it will be described further below. An encasement of the dummy object 1 with textile, water-proof clothing, preferably comprising a low weight, is not illustrated. The clothing can be embodied in several pieces, in particular of pants and a top, or in one piece, analogous to overalls, and can be provided with shoe reproductions.

The movements, which the dummy object 1 can carry out, are movements, which follow at least the leg movements, preferably also the arm movements, of a human. The leg and arm movements are controlled according to the relative velocity $V_{rel}$, the velocity at which the dummy object 1 moves in dummy object viewing direction (see FIG. 7) relative to a fixed point. The relative velocity $V_{rel}$ is determined or ascertained, respectively, within the total system (movement system), into which the dummy object 1 is introduced, for example by means of a transponder system, an ultrasound or infrared measuring system, a laser triangulation measuring system, a differential GPS, a light barrier system, rollers or velocity measurement and the like. At the onset of a motion sequence, the dummy object 1 stands with the legs being oriented in parallel, as is shown in FIG. 3, the relative velocity is 0 m/s. As soon as the relative velocity $V_{rel}$ increases, the movement of the dummy objects 1 starts by moving the right or left leg, a movement of the arms also preferably takes place opposite to the legs. The input quantity, which is significant for the motion sequence, is preferably only the relative velocity $V_{rel}$, which is varied, depending on the dummy class (child, grownup, senior). FIG. 4 shows the dummy object 1 when walking, FIG. 5 shows it when running and FIG. 6 shows it when running very fast or when racing, respectively, wherein the individual components of the dummy object 1 are not identified in FIGS. 3 to 6.

So as to follow following movement patterns as realistically as possible, the dummy classification is considered as well, namely whether the respective dummy object 1 represents a child 3 or 6 years of age, a grownup or a senior, for example. Each dummy object class comprises different motion sequences in the movement patterns. Corresponding programs control the drive unit and the components of the movement mechanisms in accordance with the motion sequences.

FIG. 7 shows a side view of the dummy object 1, comprising the angles $\alpha_g$, $\alpha'_g$, $\alpha$, $\alpha'$, $\beta_g$, $\beta'_g$, $\beta$ and $\beta'$ of various sizes, depending on the movement pattern (walking, running, racing). The angles, which are identified with "$\alpha$", are leg angles—angles between the thigh element 4 and the vertical (the central column 3a)—the angles identified with "$\beta$" are knee angles—angles between the thigh element 4 and a central line through the lower leg 12. The angles $\alpha_g$, $\alpha'_g$, $\beta_g$ and $\beta'_g$ are the respective limiting angles, which are present at the respective reversal point of the leg movements. In FIG. 7, the dummy object 1 is in a movement stage with limiting angles, for example. The leg limiting angles $\alpha_g$, $\alpha'_g$, as well as the knee limiting angles $\beta_g$, $\beta'_g$, which are a function of these angles, the step frequency and the step sizes change with an increasing or decreasing relative velocity $V_{rel}$, analogously to the movement of a human body. Analogous views apply for the arm limiting angles $\gamma_g$, $\gamma'_g$ as well as the elbow limiting angles $\delta_g$, $\delta'_g$, which are shown in FIG. 7. The angles $\gamma_g$, $\gamma'_g$ are determined between the upper arm elements 4 and the vertical (the central column 3a), the angles $\delta_g$, $\delta'_g$, are determined between the upper arm elements 4 and a central line through the forearms 11. The angles $\gamma$, $\gamma'$, $\delta$ and $\delta'$ are the angles, which in each case vary during the movement.

Figure 8:
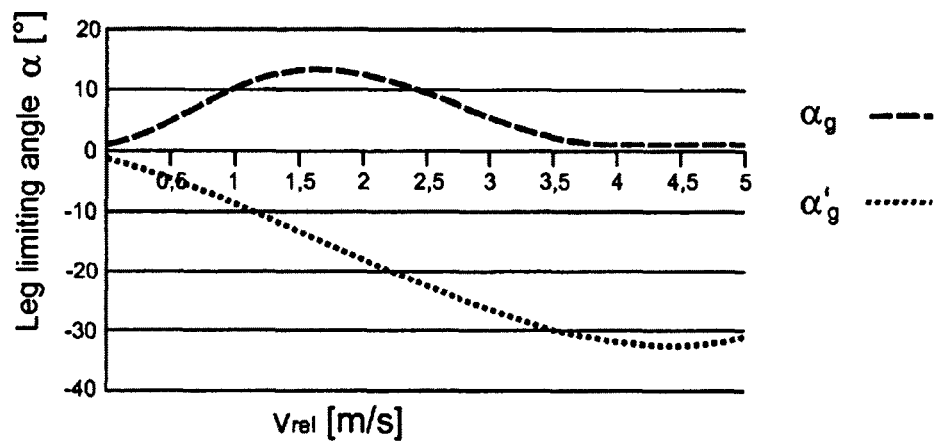
FIGS. 8, 9 and 10 show diagrams relating to the movement characteristic of the legs of the dummy object.
Figure 9:
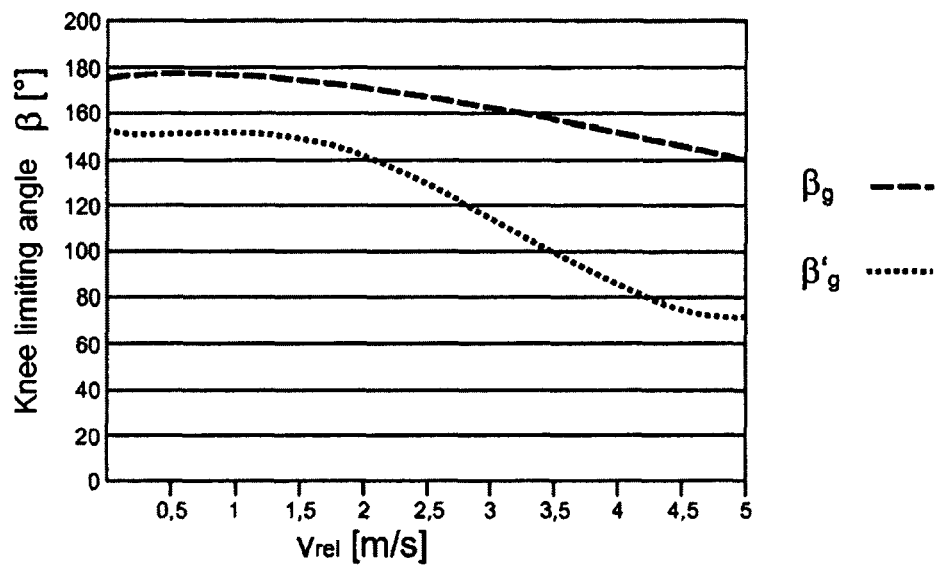

FIGS. 8 and 9 show diagrams with the movement characteristic of a dummy object 1, which is classified as "grownup". FIG. 8 shows the leg limiting angles $\alpha_g$ and $\alpha'_g$, FIG. 9 shows the knee limiting angles $\beta_g$ and $\beta'_g$, in each case according to the relative velocity $V_{rel}$. The motion sequence is controlled such that a distance of maximally 5 cm is maintained between the foot, which is placed, and the ground, and that no relative movement takes place.

Figure 10:
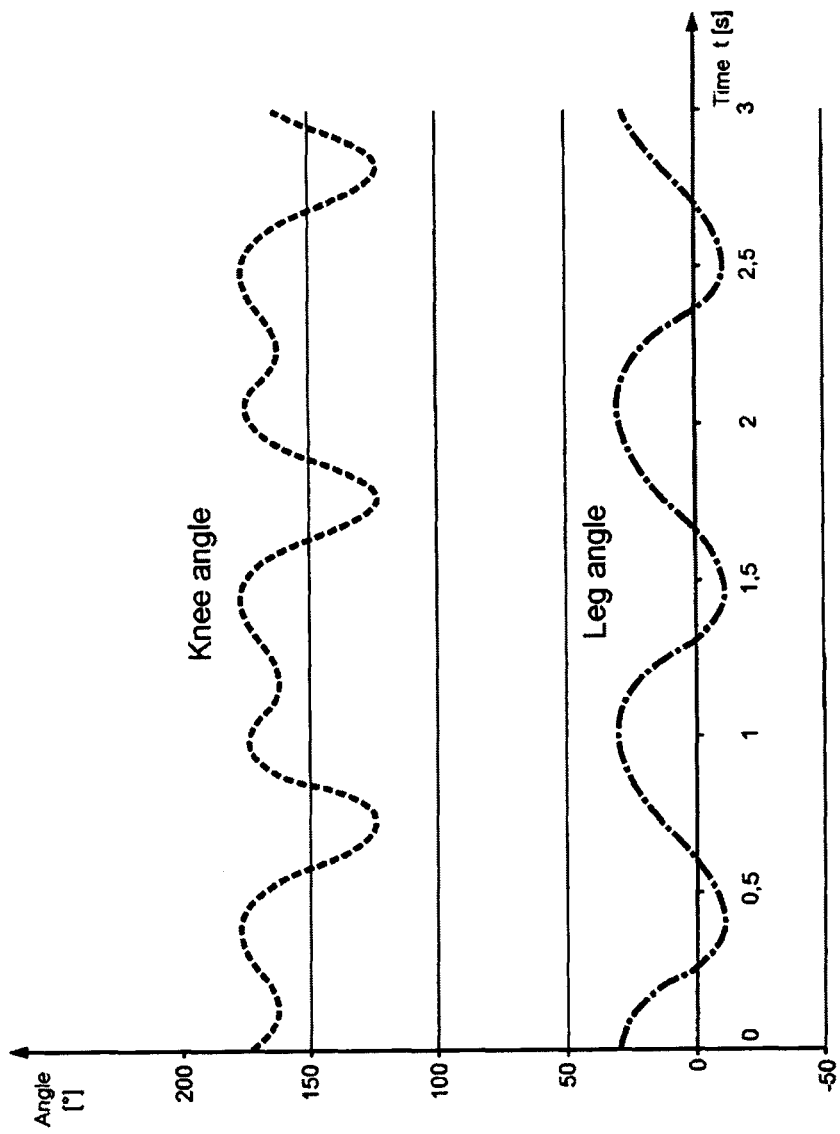
Figure 11:
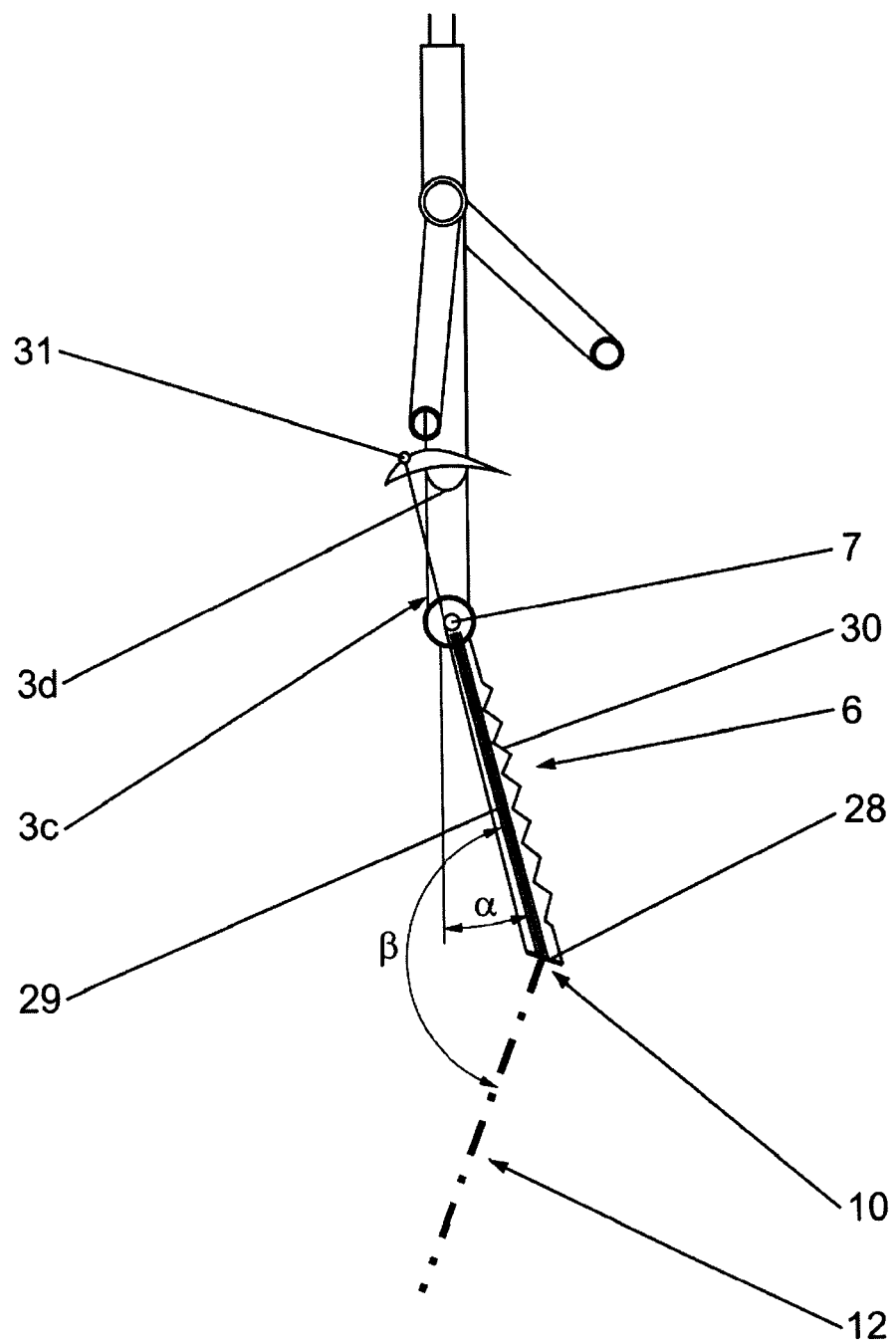
FIG. 11 and FIGS. 12a to 12c show illustrations of the basic principle of an embodiment alternative of a movement mechanism.

The diagram in FIG. 10 shows the variation of the leg angles $\alpha$, $\alpha'$ and of the knee angles $\beta$, $\beta'$ in an exemplary manner during a step sequence consisting of three steps of a dummy object 1 classified as "grownup" when walking. The leg angles $\alpha$, $\alpha'$ vary once between the two leg limiting angles $\alpha_g$ and $\alpha'_g$ while taking one step. The knee angles $\beta$, $\beta'$ vary twice while taking one step, in each case between a knee limiting angle $\beta_g$ of approx. 180° to two knee limiting angles $\beta'_g$ of varying sizes, wherein the first knee limiting angle $\beta'_g$ is present at approx. 160° in the standing phase and the second knee limiting angle $\beta'_g$, is present at approx. 135° in the swinging phase of the leg.

There is a plurality of possibilities for embodying a movement mechanism for moving the arms and legs of the dummy object 1. In the case of a possible embodiment alternative, each joint 5, 7, 9 and 10 is moved separately by means of its own servo drive—servo motors with servo controllers—. The leg angles "$\alpha$" and the knee angles "$\beta$" as well as the arm angles "$\gamma$" and "$\delta$" can be controlled electrically independent from one another. The used servo drives as well as the components, which interact with these components, are to encompass a weight, which is as low as possible. In the event that, in accordance with a further non-illustrated embodiment variant of embodiments of the invention, separate hand parts and foot parts, which are also connected to the arms or legs, respectively, by means of articulations are present on the dummy object 1, they can also be moved via separate servo drives and independent on the other servo drives. This embodiment is thus highly flexible with regard to the selection or programming, respectively, of the motion sequences.

In the case of a further embodiment alternative of the movement mechanism, the shoulder joints 5 and the hip joints 7 are moved or controlled, respectively, by means of separate servo drives. The movements of the forearms 11 and/or of the lower legs 12 can be made by means of mechanisms, which are a function of the respective leg or arm angle, respectively, which occurs during the movement. Provision can thereby also be made to control the knee joints 10 or the elbow joints 9 by means of servo drives. FIGS. 11, 12a to 12c as well as FIGS. 13a to 13f show the mode of operation and the embodiment of a mechanism, which controls the knee angles $\beta$, $\beta'$ as a function of the leg angles $\alpha$, $\alpha'$, in a schematic manner.

Central components of each mechanism are two link parts 17, which are arranged in a fixed and in a non-rotatable manner on two support elements 3d, which are fixedly connected to the central column 3a, for example. The link part 17 is a milled aluminium or plastic part, for example, and comprises two link tracks 17a, 17b, which are only shown schematically in the Figures. The link parts 17 are fastened to the trunk skeleton 3 so as to be capable of being replaced, because one link part 17 with individually designed link tracks 17a, 17b needs to be used for each of the provided movement types (walking, running, racing) and for each dummy class (child 3 years of age, child 6 years of age, grownup, senior). An articulated arm 28, which is an aluminium or plastic part, for example, and which extends in particular in the viewing direction of the dummy object 1, is fastened to the knee joint 10. The one end of the articulated arm 28 is fixedly connected to the one end of a rigid, inelastic connecting element 29, which is a rope, a Bowden cable or a rod made of metal or plastic, for example. The other end of the articulated arm 28 is connected to a second, elastically resilient connecting element 30, for example a plastic or rubber rope or a spring. In the shown embodiment, the second end of the elastic connecting element 30 is fastened to the pelvis part 3c, the second end of the connecting element 29 is in operative connection with the link part 17. For this purpose, a sliding element 31, which is a metal or plastic part and which runs on the link tracks 17a and 17b, as will be described below, is connected to the end of the connecting element 29. The connecting element 29 is further arranged such that it is continuously oriented parallel to the thigh element 6, independent from the leg movement. The starting point for a movement of the lower leg 12, which is only suggested in FIG. 11 as well as in FIGS. 13a to 13f, relative to the thigh element 6 is a rotation of the hip joint 7. The two link tracks 17a, 17b allow for an execution of the movement with the mentioned varying knee limiting angles $\beta_g$, $\beta'_g$. The sliding element 31 moves along the link track 17a in the direction of the arrow (FIG. 12a to FIG. 12e), when the thigh 6a moves forward in the direction of walking. The sliding element 31 moves along the line track 17b, when the thigh 6a moves opposite to the direction of walking. The link tracks 17a and 17b are designed in accordance with the respective dimensions and the desired angle variations, wherein the link track 17a as a whole comprises a larger curvature than the link track 17b.

Figure 13C:
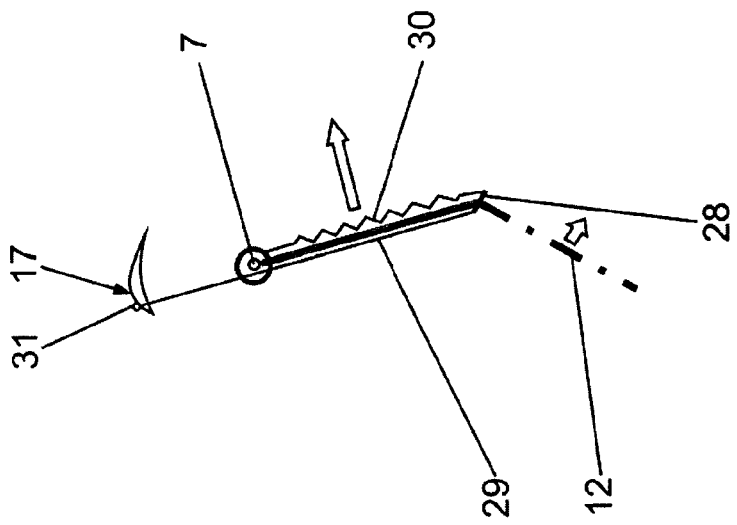
FIGS. 13a to 13f show consecutive movement phases of the leg movements of the mechanism shown in FIG. 11.
Figure 13B:
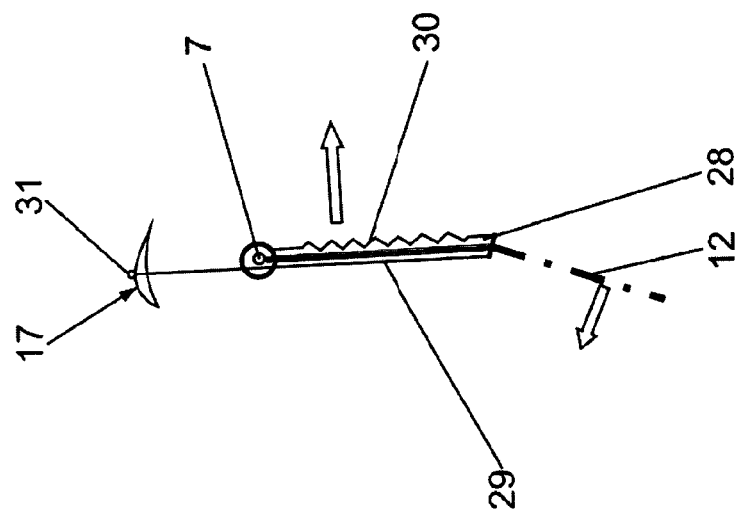
Figure 13A:
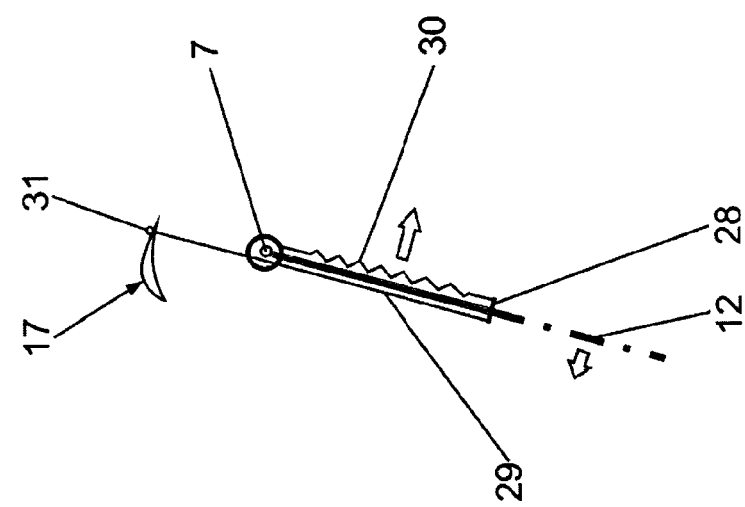
Figure 13D:
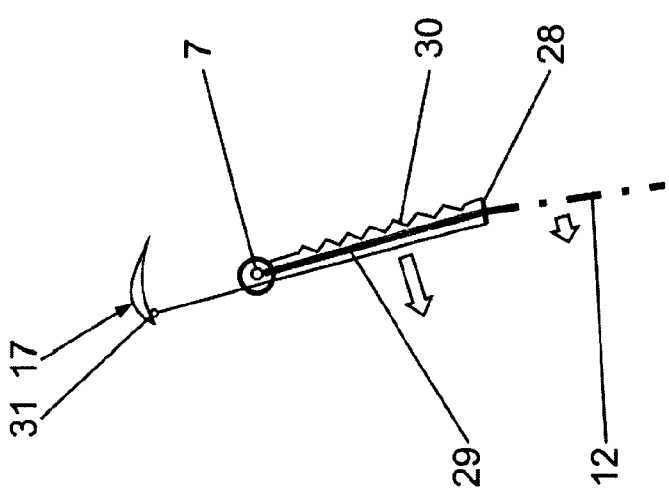
Figure 13E:
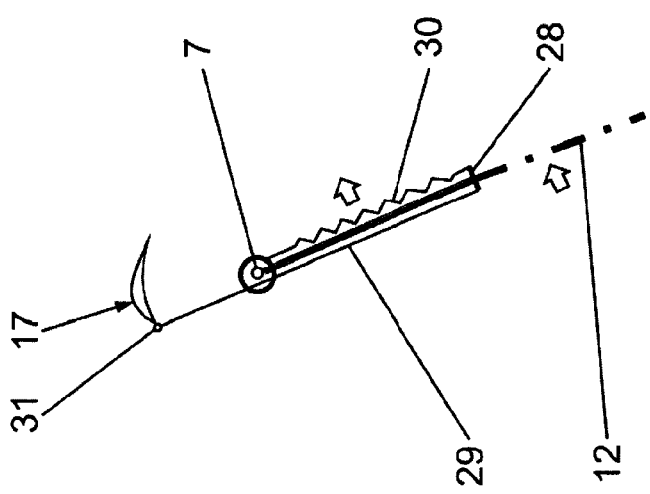
Figure 13F:
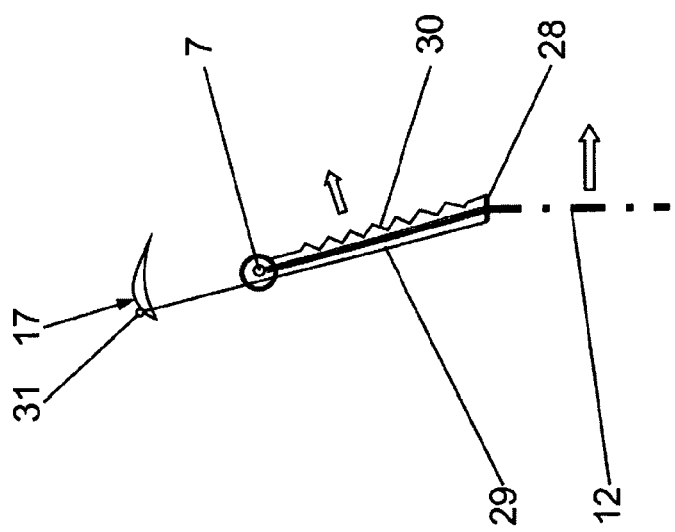

Temporally consecutive positions of the "lifting" leg during one step are illustrated in FIGS. 13a to 13f. The articulated arm 28 and thus the knee joint 10 are moved by means of the connecting element 29, which is positively controlled via the link tracks 17a and 17b, such that the knee angle β, β' varies in accordance with the real motion sequence of one leg during one step. FIG. 13a shows the rearmost position of the leg prior to lifting, FIGS. 13b and 13c show positions during the lifting, FIG. 13d shows a position immediately prior to "placing the foot". In the meantime, the sliding element 31 runs along the link track 17a. FIG. 13e corresponds to the leg position in the foremost position—when "placing the foot". The sliding element 31 is at its "turning point". In FIG. 13f, the leg moves backwards again, the sliding element 31 just started to move along the link track 17b.

Figure 12A:
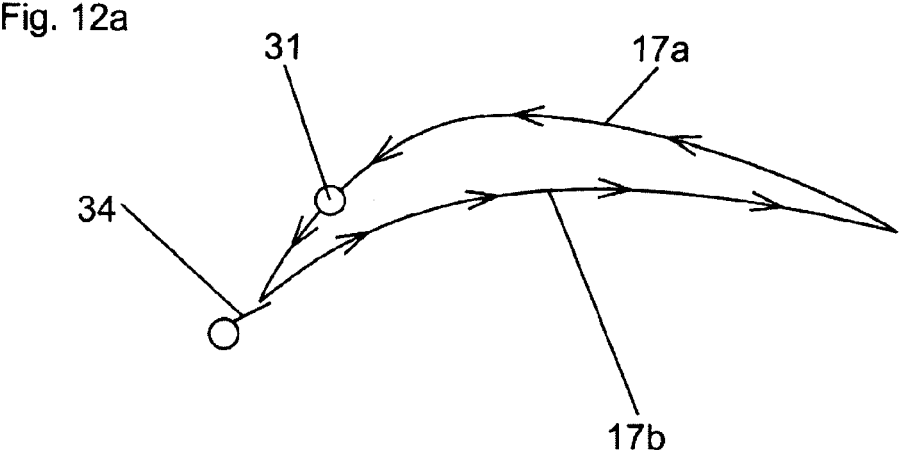
Figure 12B:
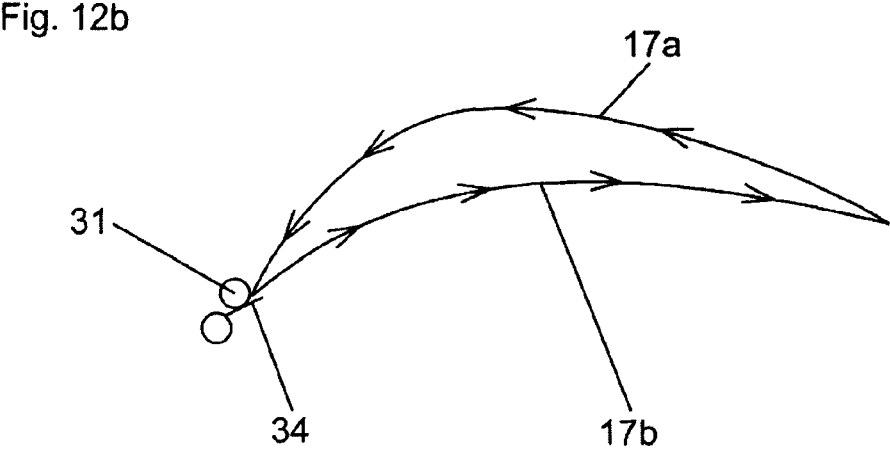
Figure 12C:
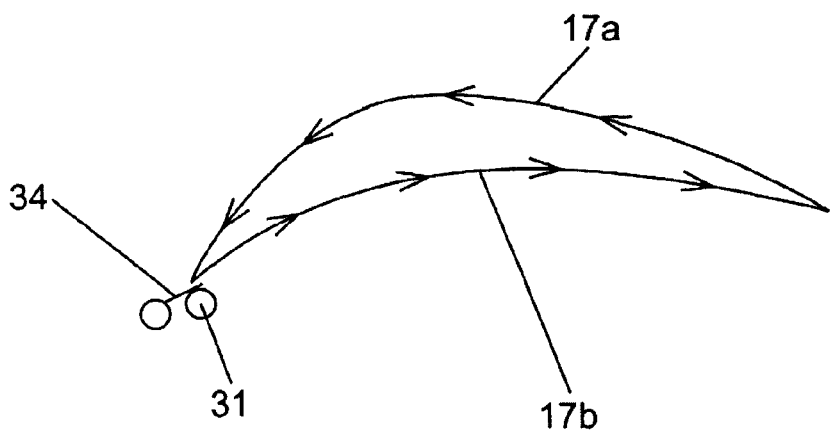

In FIGS. 12a to 12c there is suggested a possibility for guiding the sliding element 31 from the link track 17a to the link track 17c by means of a flap 34, which is pivotably arranged and which is spring-loaded.

Figure 14:
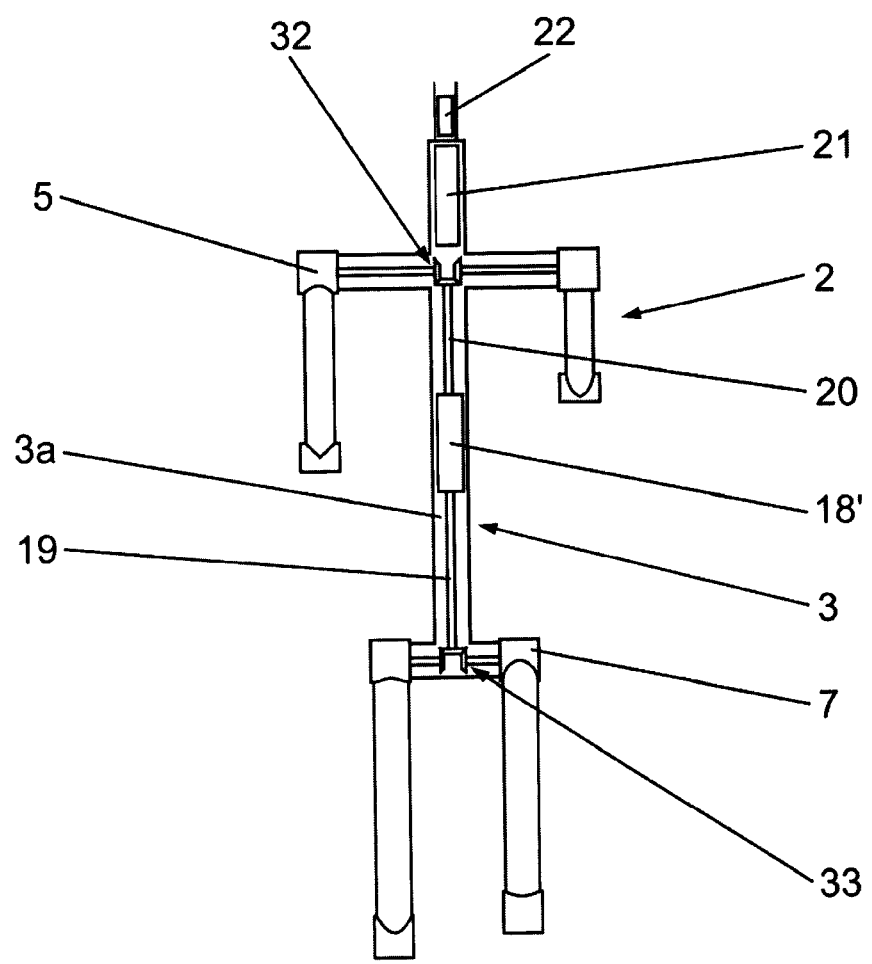
FIG. 14 shows a view of the skeleton of the dummy object comprising a further embodiment of a movement mechanism for arms and legs.

A further variant for a movement mechanism is shown schematically in FIG. 14. A drive unit 18' is installed in the central column 3a of the trunk skeleton 3, said drive unit 18' comprising a motor having an asynchronous drive for arm and leg movements, which drives shafts 19, 20, in particular made of carbon fibre composite plastic, which effects corresponding rotary motions of the shoulder joints 5 and of the hip joints 7 via angular gears 32, 33. A battery pack 21 is arranged in the central column 3a of the trunk skeleton 3 for supplying power to the drive unit 18'. Via radio, the receiver/control unit 22 can receive the relative velocity $V_{rel}$ or a signal, which correlates thereto, processes said signal and provides the control factors for the drive unit 18'.

The connection of the dummy object 1 to a movement system can take place via a rod 15, which is fixedly connected to the skeleton 2, and via the additional ropes 16 made of aramid fibres, PP fibres or PE fibres. The dummy object 1 can be connected to a rail system, which is positioned on a frame, to a driving platform arranged on the ground or to a carriage or to a rail or cable system, which is arranged laterally to the driving direction of the vehicle. The connection by means of rods and/or ropes and other elements is to be as inconspicuous as possible from a visual standpoint, thus comprise a small cross section and is to be made of a radar-invisible material. Oscillations of the dummy object 1 to the connecting locations caused by external influences, such as wind, for example, can be avoided to a large extent by means of the additional ropes 16, which brace the dummy object 1 to the movement system.

The movement system is a part of the total system and provides for a controlled and reproducible movement of the dummy object.

Figure 15:
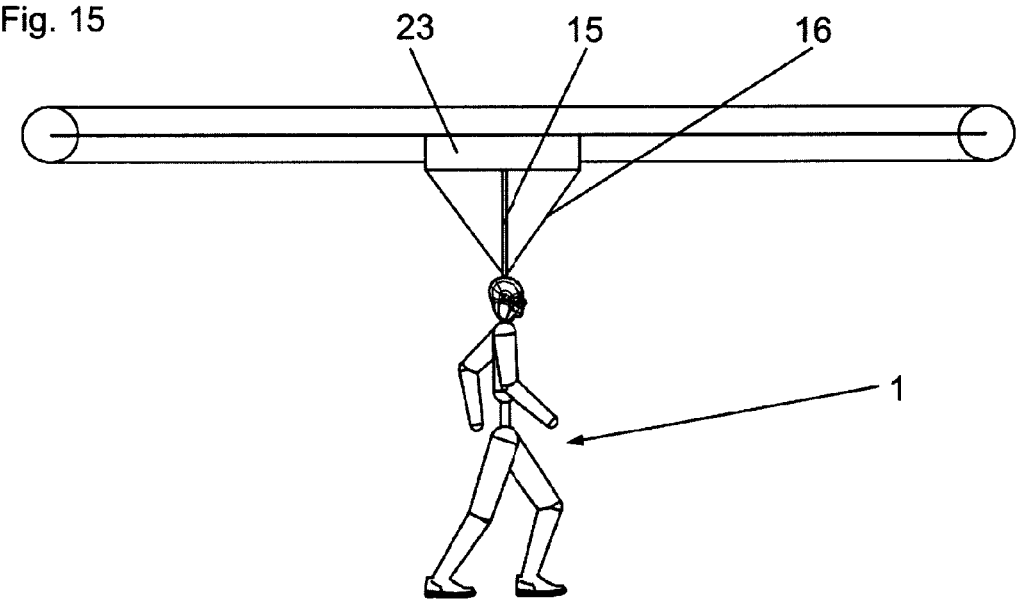
FIG. 15 shows a view of the basic principle of an embodiment of a movement system for the dummy object.

FIG. 15 shows a rail system in a schematic manner, by means of which a dummy object 1 is moved from above. The connecting elements of the dummy object 1, the rod 15 and the ropes 16 are fixedly connected to a travelling crane 23, which is coupled to a drive motor, for example via a drive belt, so that a defined movement of the dummy object 1 and a defined drive velocity and thus the relative velocity $V_{rel}$ can be adjusted. The drive motor transmits the respective drive velocity to the receiver/control unit 22 in the dummy object 1 via radio.

Figure 16:
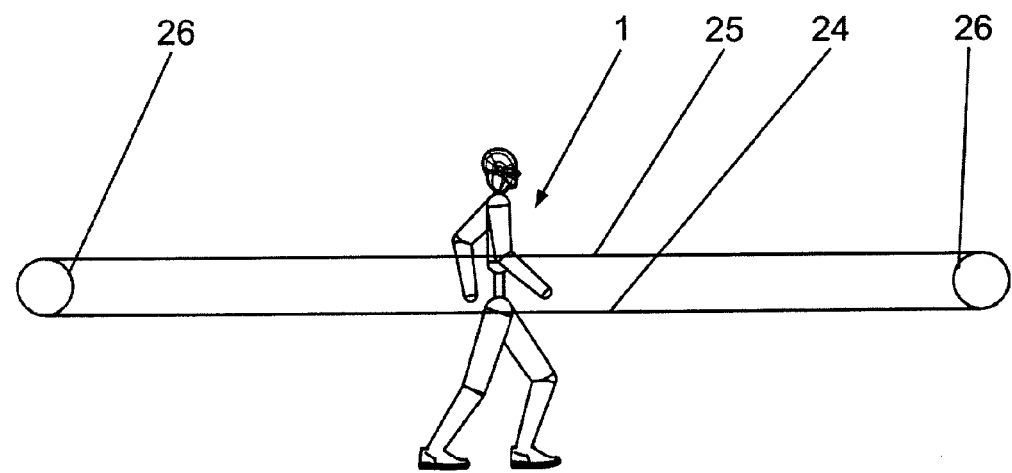
FIGS. 16, 16a and 17 show view of basic principles of further embodiments of movement systems for the dummy object according to embodiments of the invention.
Figure 16A:
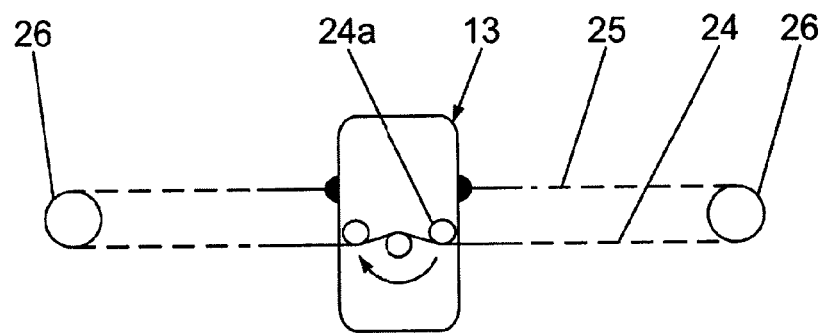

In the variant of a movement system, which is shown schematically in FIGS. 16 and 16a, provision is made for a rope system comprising a support rope 24 and a hauling rope 25. The trunk 13 of the dummy object 1 is suspended on the support rope 24 by means of rollers 24a so as to slide and roll, the hauling rope 25 is fastened to the trunk 13 and is deflected and guided via two rollers 26. In the case of one of the rollers 26, provision is made for a drive for the hauling rope 25. The relative velocity $V_{rel}$ can be determined directly via a drag roller 24b on the support rope 24 in the trunk 13, or the drive motor can transmit the drive velocity to the receiver/control unit 22 via radio.

Figure 17:
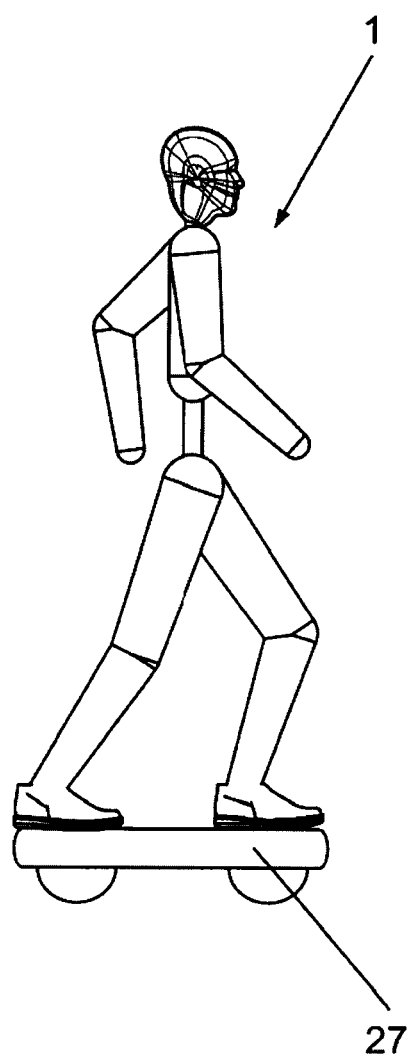

In the case of a further embodiment variant of the movement system shown in FIG. 17, provision is made for a carriage 27, a robot driver or a driving platform. The carriage 27 can be operated by remote control or can be connected to a wire drive or belt drive. Via the drive rollers of the carriage 27, the relative velocity $V_{rel}$ can be transmitted directly, also so as to be tethered, to the movement mechanism of the dummy object 1 for the leg and arm movements, wherein a receiver is not necessary. According to an alternative, it is possible for the carriage 27 to have its own drive.

To be able to use a dummy object 1 according to embodiments of the invention as flexibly as possible in already existing movement systems, provision is made for a transmitting station for data, which are transmitted to the dummy object 1. For example, the speed of the drive system can be used to transmit corresponding data, which are proportional to the relative velocity $V_{rel}$, via radio or W-LAN. A distance meter, which is arranged in the trunk 13 of the dummy object, for example on the basis of ultrasound, laser, infrared light or radar, can be used to determine the distance of the dummy object 1 to an object, which is further away. The relative velocity $V_{rel}$, which in turn controls the internal movements of the dummy object 1, can be calculated from this measurement. It is further possible to transmit the velocity to the dummy object 1 via radio or W-LAN via a position recognition system (by means of a transponder or differential GPS).

Dummy objects, which are realized according to embodiments of the invention, can also be used as bicycle dummies. For this purpose, the dummy, which can be moved accordingly in accordance with embodiments of the invention, is fixedly connected to a bicycle frame. A drive motor, which is arranged on the bicycle frame, can thereby move the legs via the pedals. The arms, the trunk and the head are not moved.

LIST OF REFERENCE NUMERALS 1 dummy object
2 skeleton
3 trunk skeleton
3a central column
3'a neck section
3b shoulder part
3c pelvis part
3d support element
4 upper arm element
4a upper arm
5 shoulder joint
6 thigh element
6a thigh
7 hip joint
8 head
9 elbow joint
10 knee joint
11 forearms
12 lower legs
13 trunk
14 foot part
15 rod
16 rope
17 link part
17a link track 17b link track
18 drive unit
18' drive unit
19 shaft
20 shaft
21 battery pack
21' battery pack
22 receiver/control unit
23 travelling crane
24 support rope
24a roller
24b drag rollers
25 hauling rope
26 roller
27 carriage
28 articulated arm
29 connecting element
30 connecting element
31 sliding element
32 angular gear
33 angular gear
34 flap
$\alpha_g$ limiting angle
$\alpha'_g$ limiting angle
$\gamma$ leg angle
$\alpha'$ leg angle
$\beta_g$ limiting angle
$\beta'_g$ limiting angle
$\beta$ knee angle
$\beta'$ knee angle
$\gamma$ arm angle
$\gamma'$ arm angle
$\delta$ elbow angle
$\delta'$ elbow angle
$V_{rel}$ relative velocity

The invention claimed is:

1. A three-dimensional dummy object, in particular for functionally testing driver assistance systems in motor vehicles, comprising a head, a skeleton, movable arm and movable legs,
characterized in that
the skeleton comprises a trunk skeleton having cavities, to which the anus and legs are articulated, wherein the legs each have a thigh and a lower leg articulated to the thigh, wherein a drive unit and a receiver/control unit are installed in the trunk skeleton, which receiver/control unit receives signals correlating to the relative velocity of the moving dummy object as input quantity, such that the movement pattern of the thighs and lower legs can be varied according to the relative velocity of the dummy object by means of an installed movement mechanism between a first movement pattern and a second movement pattern wherein the relative angles of the thighs and lower legs during a step during the first movement pattern are different than the relative angles of the thighs and lower legs during a step in the second movement pattern.

2. The dummy object according to claim 1, characterized in that the trunk skeleton comprises a central column, which supports the head, two shoulder parts and two pelvis parts, and wherein the first movement pattern comprises a walking orientation, and the second movement pattern comprises a running orientation.

3. The dummy object according to claim 2 characterized in that the arms each have an upper arm and a forearm, which is articulated thereto, wherein upper arm and forearm are movable according to movement patterns, which can be varied according to the relative velocity of the dummy object by means of an installed movement mechanism.

4. The dummy object according to claim 3, characterized in that the movement patterns of the arms comprise variations of the arm angles between an upper arm and the central column of the trunk skeleton and the elbow angles between the upper arm and the forearm.

5. The dummy object according to claim 2, characterized in that the central column is fixedly connected to a rod, which projects beyond the head and which forms a connecting element to a movement system.

6. The dummy object according to claim 2, characterized in that
the central column is fixedly connected to a rod, which projects beyond the head and which forms the connection to a rail system, which is arranged on the top, and which is moved via a linear drive, or
the central column is fixedly connected in the centre to a rod on the side and forms the connection to a laterally arranged rail system and is moved via a linear drive, or
the central column is suspended so as to roll on a support rope and is set into motion via a hauling rope or a drive belt linear drive, or
the central column is fixedly connected on the bottom to a rod and forms the connection to a movement system, which is arranged on the bottom, and includes a driving platform for moving the dummy object.

7. The dummy object according to claim 1, characterized in that the movement patterns of the legs comprise variations of the leg angles between the thigh and the central column of the trunk skeleton and the knee angles between the thigh and the lower leg.

8. The dummy object according to claim 7, characterized in that the central column is fixedly connected by means of ropes, in particular made of at least one of aramid fibres, PP fibres and PE fibres, which form further connecting elements to a movement system.

9. The dummy object according to claim 1, characterized in that the arms are movable in a direction opposite to the direction in which the legs are being concurrently moved.

10. The dummy object according to claim 1, characterized in that at least one of
the head, the arms, the legs and at least a part of the trunk are moulded parts of at least one of EPP and EPE.

11. The dummy object according to claim 1, characterized in that the trunk skeleton is embodied in one piece.

12. The dummy object according to claim 1, characterized in that the skeleton parts consist of CFRP.

13. The dummy object according to claim 1, characterized in that the skeleton includes at least one shoulder joint for articulatingly coupling the trunk to at least one of the movable arms for permitting the arms to move relative to the trunk, and at least one pelvis joint for articulatingly coupling the trunk to at least one of the movable legs for permitting the leg to move relative to the trunk, and wherein
the movement mechanism comprises servo drives disposed adjacent to at least one of the arm and pelvis joints.

14. The dummy object according to claim 1, characterized in that the arms include upper arms and forearms articulatingly coupled to the upper arms, and wherein at least one of the forearms are movement-coupled mechanically to the upper arms, and the lower legs are movement-coupled mechanically to the thighs.

15. The dummy object according to claim 1, characterized in that the movement mechanism comprises a drive unit having a motor with an asynchronous drive, which drives two shafts, which set the shoulder joints and the hip joints in rotary motion via angular gears.

16. A three-dimensional dummy object, in particular for functionally testing driver assistance systems in motor vehicles, comprising a head, a skeleton, movable arms and movable legs, characterized in that the skeleton comprises a trunk skeleton having cavities, to which the arms and legs are articulated, wherein the legs each have a thigh and a lower leg articulated to the thigh, wherein a drive unit and a receiver/control unit are installed in the trunk skeleton, which receiver/control unit receives signals correlating to the relative velocity of the moving dummy object as input quantity, such that the movement pattern of the thighs and lower legs can be varied according to the relative velocity of the dummy object by means of an installed movement mechanism further characterized in that the arms include upper arms and forearms articulatingly coupled to the upper arms, and wherein at least one of the forearms are movement-coupled mechanically to the upper arms, and the lower legs are movement-coupled mechanically to the thighs, and the coupling mechanism comprises a link part fixedly connected to the trunk skeleton, an articulated arm fixedly connected to the knee joint, a rigid connecting element between articulated arm and link part and an elastic connecting element between the articulated arm and the trunk skeleton.

17. The dummy object according to claim 1 wherein during the first movement pattern the relative angles of the thighs and lower legs during a step simulate the relative angles of human thighs and lower legs during a walking step, and wherein during the second movement pattern, the relative angles of the thighs and lower legs during a step simulate the relative angles of human thighs and lower legs during a running step, the relative angles of the thighs and lower legs during a step during the walking step being different than the relative angles of the thighs and lower legs during a running step.

18. The dummy object according to claim 1 wherein the movement pattern of the thighs and lower legs can be varied according to the relative velocity of the dummy object by means of an installed movement mechanism between the first movement pattern comprising a walking step, the second movement pattern comprising a running step, and a third movement pattern comprising a racing step, wherein the relative angles of the thighs and lower legs during a racing step are different than the relative angles of the thighs and lower legs during either a walking or a running step.

19. The dummy object according to claim 18 wherein during the walking step the relative angles of the thighs and lower legs during a step simulate the relative angles of human thighs and lower legs during a walking step, and wherein during the running step, the relative angles of the thighs and lower legs during a step simulate the relative angles of human thighs and lower legs during a running step, and wherein during the racing step the relative angles of the thighs and lower legs during a step simulate the relative angles of human thighs and lower legs during a racing step, the relative angles of the thighs and lower legs during each of the walking step, racing step and running step all being different from each other.

20. The dummy object according to claim 1 wherein the movement pattern of the thighs and lower legs can be varied according to the relative velocity of the dummy object by means of an installed movement mechanism between the first movement pattern comprising a walking step, and the second movement pattern comprising a running step.

21. A three-dimensional dummy object, in particular for functionally testing driver assistance systems in motor vehicles, comprising a head, a skeleton, movable arms and movable legs, characterized in that the skeleton comprises a trunk skeleton having cavities, to which the arms and legs are articulated, wherein the legs each have a thigh and a lower leg articulated to the thigh, wherein a drive unit and a receiver/control unit are installed in the trunk skeleton, which receiver/control unit receives signals correlating to the relative velocity of the moving dummy object as input quantity, such that the movement pattern of the thighs and lower legs can be varied according to the relative velocity of the dummy object by means of an installed movement mechanism further characterized in that the arms include upper arms and forearms articulatingly coupled to the upper arms, and wherein at least one of the forearms are movement-coupled mechanically to the upper arms, and the lower legs are movement-coupled mechanically to the thighs, and the coupling mechanism comprises a link part fixedly connected to the trunk skeleton, an articulated arm fixedly connected to the elbow joint, a rigid connecting element between the articulated arm and link part and an elastic connecting element between the articulated arm and the trunk skeleton.

22. The dummy object according to claim 21, characterized in that the rigid connecting element comprises a sliding element, which is operatively connected to the link part, or the link part comprises at least one link track for the sliding element, or the link part comprises two differently formed link tracks, which merge into one another.

23. The dummy object according to claim 21 wherein the coupling mechanism is configured to permit a movement pattern of the thighs and lower legs that can be varied between a walking orientation and a running orientation wherein the relative angles of the thighs and lower legs during a step during the walking orientation are different than the relative angles of the thighs and lower legs during a step in the running orientation.

* * * * *